July 24, 1962  B. WANNER  3,045,573
CAMERA COUPLING MEANS
Filed Aug. 25, 1959  2 Sheets-Sheet 1

INVENTOR
BERTIL WANNER

ATTORNEYS

July 24, 1962  B. WANNER  3,045,573
CAMERA COUPLING MEANS

Filed Aug. 25, 1959  2 Sheets-Sheet 2

INVENTOR
BERTIL WANNER

ATTORNEYS

United States Patent Office 3,045,573
Patented July 24, 1962

3,045,573
CAMERA COUPLING MEANS
Bertil Wanner, N. Fogelbergsgatan 4,
Gothenburg, Sweden
Filed Aug. 25, 1959, Ser. No. 835,949
Claims priority, application Sweden Aug. 29, 1958
9 Claims. (Cl. 95—18)

This invention relates to devices for coupling two cameras for taking stereo and panorama views.

The use of two cameras for stereo views is known. It is a drawback of these known arrangements that the cameras must be provided with holders, supports or covers made specifically for the cameras to be used, or the cameras must be specially designed or altered, which will increase the costs to an undesired degree.

It is an object of this invention to provide a device which is cheap to make and is capable of turnably coupling two cameras of any kind without any change of the camera housings.

Another object of the invention is to provide a device for pivotally coupling two cameras where the shutter releasers are synchronized independently of the angle between the cameras.

A further object of this invention is to provide a device for pivotally coupling two cameras where a centrally disposed view finder will remain centrally directed independent of the angle between the cameras.

With these and other objects in view the invention concerns a device for pivotally coupling two cameras, said device being intended to be disposed between them, and being provided with an axle with pivotally mounted attaching arms for the camera housings, said axle being a carrier of synchronizing arms for the shutter releasers of the cameras.

Figure 8:
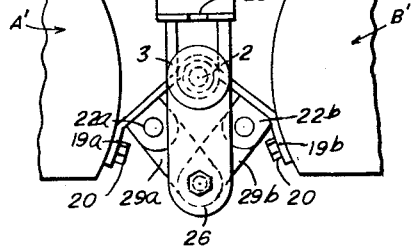

FIGURE 8 a top plan view thereof.

Figure 1:
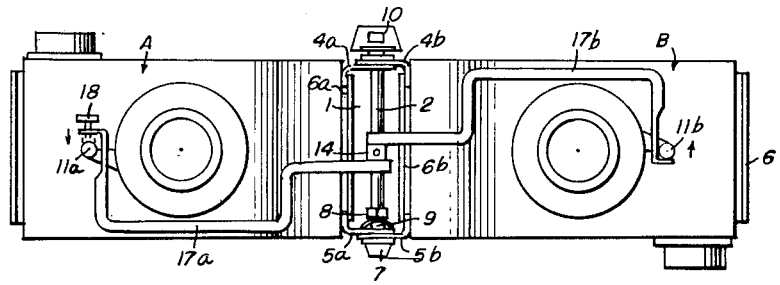
FIGURE 1 is a front view of two cameras assembled by the device in one embodiment, and FIGURE 2 a plan top view thereof.
Figure 2:
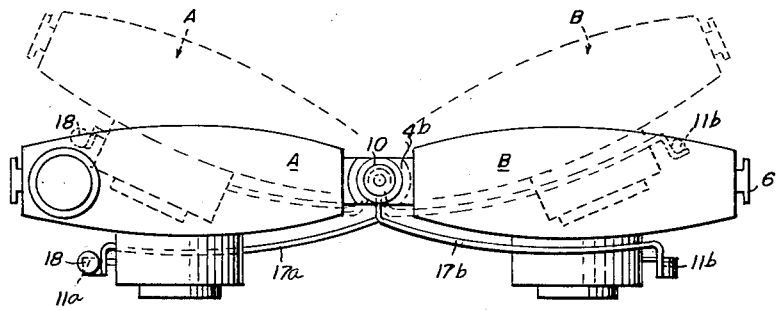
Figures 3, 4:
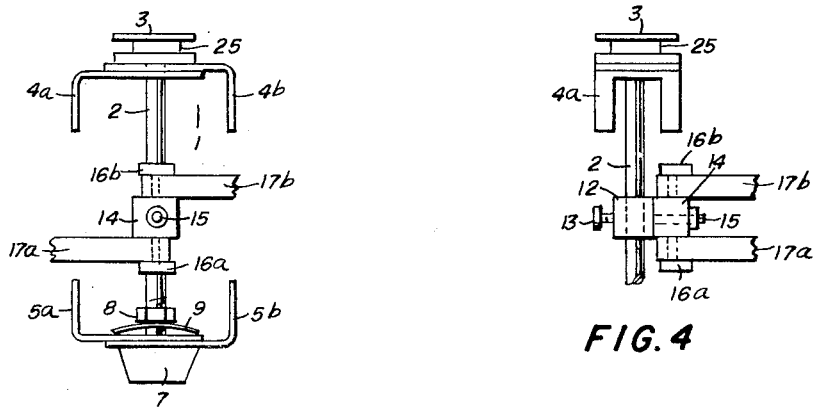
FIGURE 3 is a front view of a portion of the device in a larger scale.
FIGURE 4 is a side view thereof.
Figure 5:
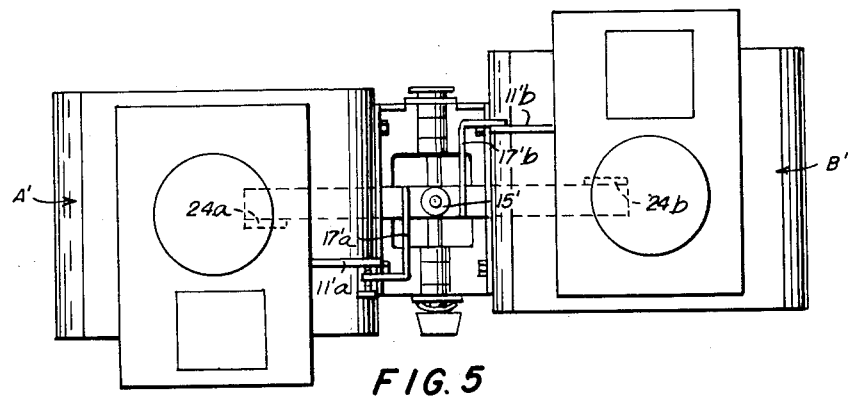
FIGURE 5 is a front view of two cameras of another design assembled by the device in another embodiment, and FIGURE 6 a plan top view thereof.

In FIGURES 1 and 2 the two cameras are denoted A and B. The camera B is turned upside down. These cameras may be of a certain type, newly brought in the market, that are manufactured with a vertical rib 6 of T-section at the ends. The embodiment of the device 1 in FIGURES 1 to 4 is exemplified to show the possibility of assembling cameras of this type without the use of screws and such like.

The device 1, intended to be disposed between the two opposing ends of the cameras, consists of an axle or pivot 2 with a head 3 and a threaded end. Arms 4a· 4b, 5a, 5b are pivotally mounted on the axle. Each arm has its end portion bent in right angle, and this end portion has the shape of a fork suited to be inserted into the end of the corresponding T-section rib 6a, 6b of the opposing camera ends, viz. two arms at the upper end of the ribs beneath the axle head, and two arms at the lower ends of the ribs. The axle is centrally poistioned and has a tightening nut 7 beneath the lower arms. Another nut 8 above these arms presses a springy washer 9 against the arm when the nut 7 is tightened. At the same time the axle head is pressed against the upper arms locking the device in position. Thus the two cameras are turnably combined with each other, and are able to be frictionally maintained in the set angle position. The axle head carries an optical view finder 10, the latter maintaining a straight forward direction independent of the set angle by means of an arrangement described hereinafter and shown in FIGURE 8.

The axle 2 carries a device for synchronizing the two shutter releasers 11a, 11b of the cameras. A supporter 12 is mounted on the axle and secured in a suitable position, for instance, by a screw 13. A holder 14 is pivotally mounted on an axle pin 15 directed horizontally from the supporter, viz. in a right angle to the axle 2. Said holder is provided with two axle pins 16a, 16b in parallelism with the axle 2 and preferably positioned opposite each other, each pin being the fulcrum pin for an arm 17a, 17b extending onto and actuating, by its outer end portion, a corresponding shutter releaser 11a, 11b. The releaser levers may pass through slots in the arms. At least one of the arms may be provided with an adjusting screw 18 to secure an exact synchronism for the releasers. The releasing is done in the usual way by the fingers, and the releasers are easily reached in their positions laterally outwards of the lens as shown in this embodiment.

Because of the bearing mounting for the arms these are swingable in the vertical as well as in the horizontal plane, and they will follow the shutter releasers when the cameras are set for stereo views or turned to the position for panorama views. In panorama views the one camera view is a direct continuation of the other camera view, and stop means may limit the turning movement for this position. It is of extreme importance that the fulcrum pins 16a, 16b are positioned very close to the axle 2 in order to avoid radial discrepancies for the outer arm ends. For the same reason it is also of advantage that both the fulcrum pins lie in the same vertical plane as the axle.

A further embodiment of the device is shown in FIGURES 5 to 8 applied to two cameras A' and B' with housings where no attachment ribs are present. The axle 2 of this device 1' is the same as described above, thus provided with a head 3 and a threaded end. This axle is the axle of a hinge with two wings 19a, 19b to be attached to the cameras by means, for instance, of screw pins and nuts, said screw pins 20 being preferably fixed to the cameras. The fixing of the screw pins is the only additional work on the camera housings themselves. A central portion 21 is cut away in the wings to create a free space for the axle and for synchronizing arms. At the top each wing is provided with a horizontal ear 22a, 22b.

As in the embodiment previously described the two arms 17'a, 17'b for the synchronizing are turnably mounted on a horizontal pin 15' from a supporter 12' slidably mounted on the axle 2, which supporter is held in position by means, for instance, of pipe pieces 23 on the axle 2 within the space 21. In this execution it is preferred to give the shutter releasers 11'a, 11'b an elongated shape, such that each of them covers a space which can be reached by the outer end of the corresponding arm 17'a, 17'b in every usable angle position for the cameras. The advantage in this case is that the synchronizing action is possible for arms which are swingable in the vertical plane only. For these arms, finger grips 24a, 24b are suitably placed at the back of the cameras. However the arm construction of the previous embodiment may be used if desired. The tightening of the nut 7 towards the lower edges of the wings compressing a between-lying springy washer 9' will retain the cameras in a set angle.

In FIGURE 8 the mechanism is shown by which a view finder is held in the correct forward direction independent of the turn angle for the cameras. The head 3 of the axle 2 is provided with a ring groove 25 (FIGURE 4) as a guide for a flat slide 26 which has a forked end suited for the groove, on which end the view finder, in the shape of the optical finder 10 (FIGURE 1) or of a finder 27 provided with view slots 28, is attached for instance in such position that it serves as a stop means against the head when the cameras are turned to the position for panorama views. The other end of the slide is turnably linked to two legs 29a, 29b, one of the latter being pivotally linked to the ear 22a and the other leg to the ear 22b, or to the corresponding arms 4a, 4b (FIGURE 1). By means of this arrangement the slide and the view finder will always maintain its forward direction in the central plane between the cameras. If it is desired to prevent the axle from turning two opposite grooves on the axle may be substituted for the ring groove.

Figure 6:
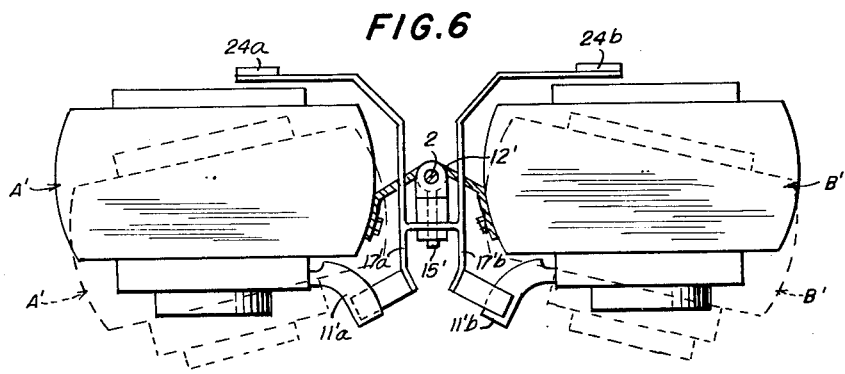
Figure 7:
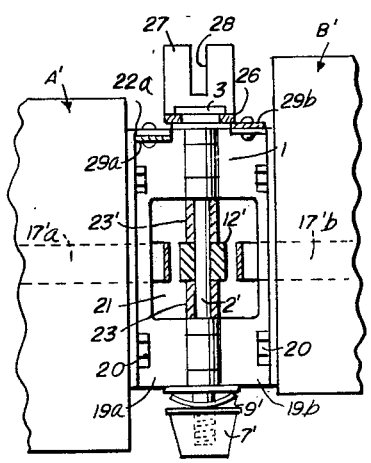
FIGURE 7 is a front view of the latter device in a larger scale.

The device of FIGURE 7 may be used also for the arrangement when both the shutter releasers are pushed in the same direction, viz. when both the cameras are in upright position, as the supporter 12' is able to slide up and down on the axle if the tube pieces 23 are removed. If the shutter releasers oppose each other as seen in FIGURE 6, one of the cameras has to be executed as a lefthand-camera in reference to the shutter releaser.

The device according to FIGURES 5 to 8 can be used for cameras of all kinds.

In the drawing and specification there have been set forth embodiments to exemplify the invention and not for purposes of limitation, the scope of the invention being defined in the claims.

What I claim is:

1. A device for pivotally combining two cameras for simultaneous use, each said camera including a shutter releaser, said device comprising an axle, arms pivotally mounted on the axle for connection to the cameras, synchronizing arms for the shutter releasers of the cameras movably mounted on the axle and adapted to extend to said shutter releasers, the synchronizing arms being carried by a part turnable around an axis perpendicular to the axle, said part being provided with means for an independent swinging movement of each arm around axes perpendicular to the axis of the part, the synchronizing arms being provided with means for their connection with the corresponding shutter releasers to follow the turning adjustments of the cameras.

2. A device for coupling two cameras each including a shutter releaser for use in taking stereo and panoramic pictures, said device comprising an axle, arms each adapted to be secured to a camera and turnably mounted on the axle, synchronizing arms for the shutter releasers of the cameras movably mounted on the axle, the synchronizing arms being carried by a part turnable around an axis perpendicular to the axle, the outer end of each synchronizing arm being positioned to actuate the corresponding shutter releaser in a space covered by the releaser in both the extreme adjustment positions of the corresponding camera.

3. A device for pivotally combining two cameras comprising an axle, connecting arms pivotally mounted on the axle for the connection of the cameras, synchronizing arms to operate the shutter releasers of the cameras movably mounted on the axle, the axle being disposed as a directing guide for a view finder centrally positioned in reference to the cameras, a slide in coaction with the axle used as a guide for a movement in the direction of the cameras along the central vertical plane between them, a view finder mounted on said slide, said slide being pivotally linked to the end of two legs at an end remote from the axle, the other ends of the legs each being turnably linked to a corresponding arm of the connecting arms between the axle and the cameras.

4. A device for pivotally coupling two cameras, each including a shutter releaser for simultaneous use in taking stereo or panoramic pictures, said device comprising an axle, arms turnably mounted on the axle for connection to the cameras, synchronizing arms for the shutter releasers of the cameras movably mounted on the axle, the axle being disposed as a directing guide for a view finder centrally positioned in reference to the cameras, and means to prevent the axle from turning during the turning movement of the cameras.

5. A device for pivotally combining two cameras comprising an axle, connecting arms pivotally mounted on the axle for the connection of the cameras, synchronizing arms for the shutter releasers of the cameras movably mounted on the axle, the connecting arms and the axle forming a hinge-like device with a free central space for the synchronizing arms, the outer end of each synchronizing arm being positioned to actuate the corresponding shutter releaser in a space covered by the releaser in both the extreme turning adjustment positions of the corresponding camera, and tightening nuts mounted on the axle to assemble the hinge parts and to act upon the horizontal edges of the hinge arms to frictionally maintain them in different turn positions of the cameras.

6. A device for pivotally combining two cameras each including shutter releasers, the device comprising an axle, arms pivotally mounted on the axle for connection to the cameras to position the axle in a central plane between the cameras such that the cameras can be turned from a stereo taking position to such a panoramic picture taking position that the two camera pictures are a direct continuation of each other, and synchronizing arms for the shutter releasers of the cameras movably mounted on the axle and adapted to engage the shutter releasers in all positions of said cameras.

7. The device of claim 6, wherein the synchronizing arms for the releasers of the cameras are rotatable around an axis perpendicular to the axle.

8. The device of claim 7, in which said synchronizing arms are mounted by means of an intermediate part provided with means for an independent movement of each arm around axes perpendicular to said axis.

9. The device of claim 7, wherein link means are combined with the camera holding arms to prevent said axle from being turned during the turning movement of the cameras, said axle maintaining the axis of the synchronizing arms in the central plane between the cameras during the turning of the latter.

References Cited in the file of this patent

UNITED STATES PATENTS

| | | |
|---|---|---|
| 1,958,339 | Haberman | May 8, 1934 |
| 2,609,738 | Staehlin | Sept. 9, 1952 |
| 2,841,063 | Park | July 1, 1958 |